INVENTORS
ALTON P. MUSSLEWHITE
JAMES W. MUSSLEWHITE
BY McMorrow, Berman & Davidson
ATTORNEYS

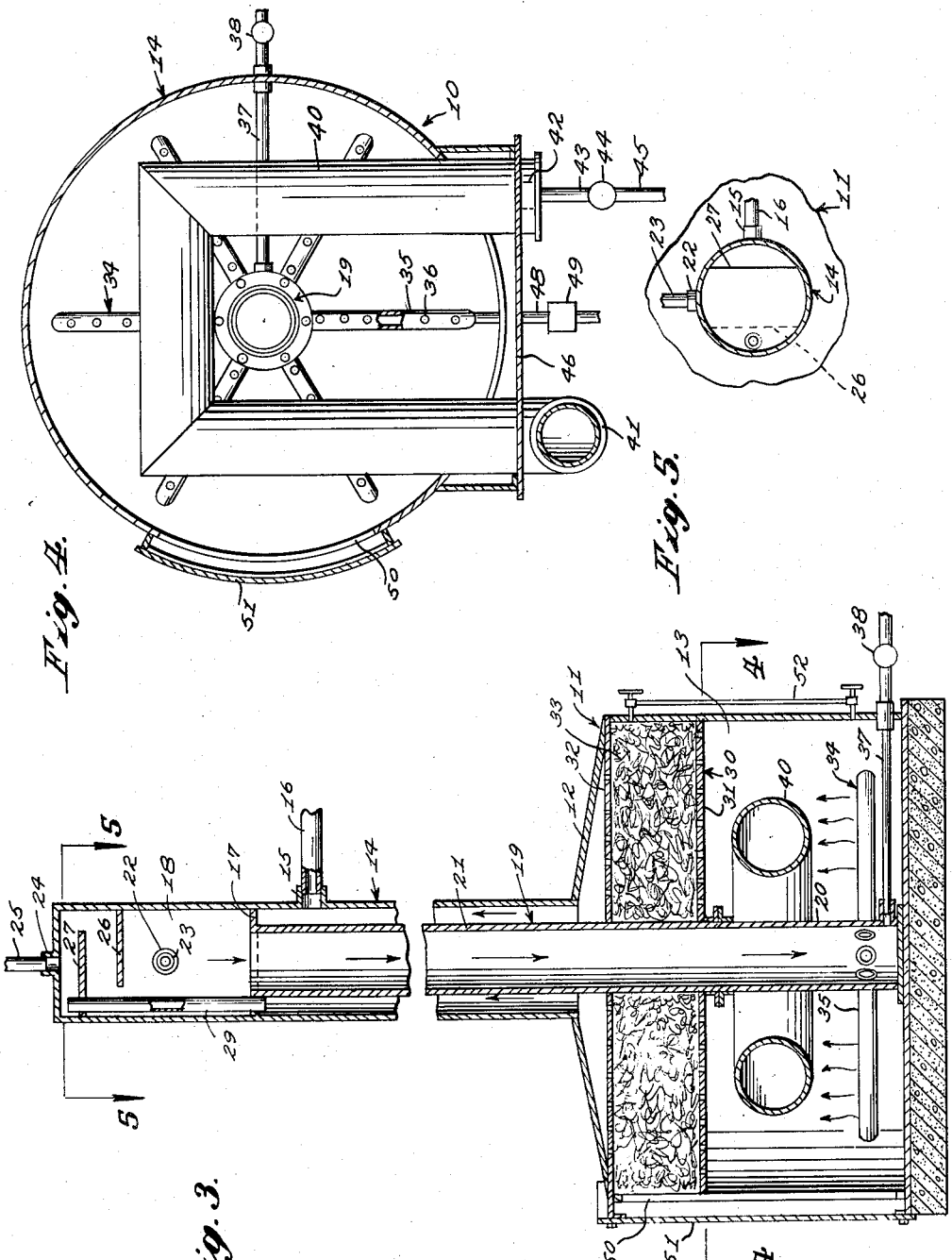

Patented Jan. 20, 1953

2,626,007

UNITED STATES PATENT OFFICE 2,626,007

ATMOSPHERE-TYPE EMULSION TREATER

Alton P. Musslewhite and James W. Musslewhite, Arp, Tex.

Application January 5, 1951, Serial No. 204,609

4 Claims. (Cl. 183—2.7)

This invention relates to an atmosphere-type emulsion treater for separating water and other foreign matter from crude oil.

An object of this invention is to provide an emulsion treater which is particularly adapted to receive crude oil from a well and to separate therefrom water, gas, and other impurities, and to separately withdraw the clean oil, gas and the water containing the impurities.

Another object of this invention is to provide an atmosphere-type emulsion treater of the type described including a built-in heat exchanger which preheats the incoming emulsion and cools the outgoing cleaned oil.

A further object of this invention is to provide an atmosphere-type emulsion treater of the type described which is particularly adapted to decrease the velocity of the incoming emulsion as it passes through the treating chamber.

A still further object of this invention is to provide an atmosphere-type emulsion treater which is particularly adapted for use in any oil field where the oil produced from the well is contaminated with water, gas and other foreign substances, for cleaning the oil so that it will be acceptable to pipe-line companies for transportation to purification stations.

A still further object of this invention is to provide an atmosphere-type emulsion treater of the type including a built-in heat exchanger which preheats the incoming emulsion and cools the outgoing cleaned oil, thereby minimizing the viscosity of the incoming emulsion and maximizing the volume and the A. P. I. gravity of the cleaned oil.

A still further object of this invention is to provide an atmosphere-type emulsion treater which is structurally arranged to include a built-in heat exchanger having large heat transfer surfaces, whereby the heated clean oil can effectively preheat the incoming emulsion.

The above and still further objects and advantages of the present invention will become apparent upon consideration of the following detailed description of the invention, when taken in conjunction with the accompanying drawings, wherein:

Figure 3 is a longitudinal sectional view taken along the line 3—3 of Figure 2, with parts broken away and shown in section;

Figure 4 is a sectional view taken along the line 4—4 of Figure 3; and

Figure 5 is a fragmentary sectional view taken along the line 5—5 of Figure 3.

Figure 1:
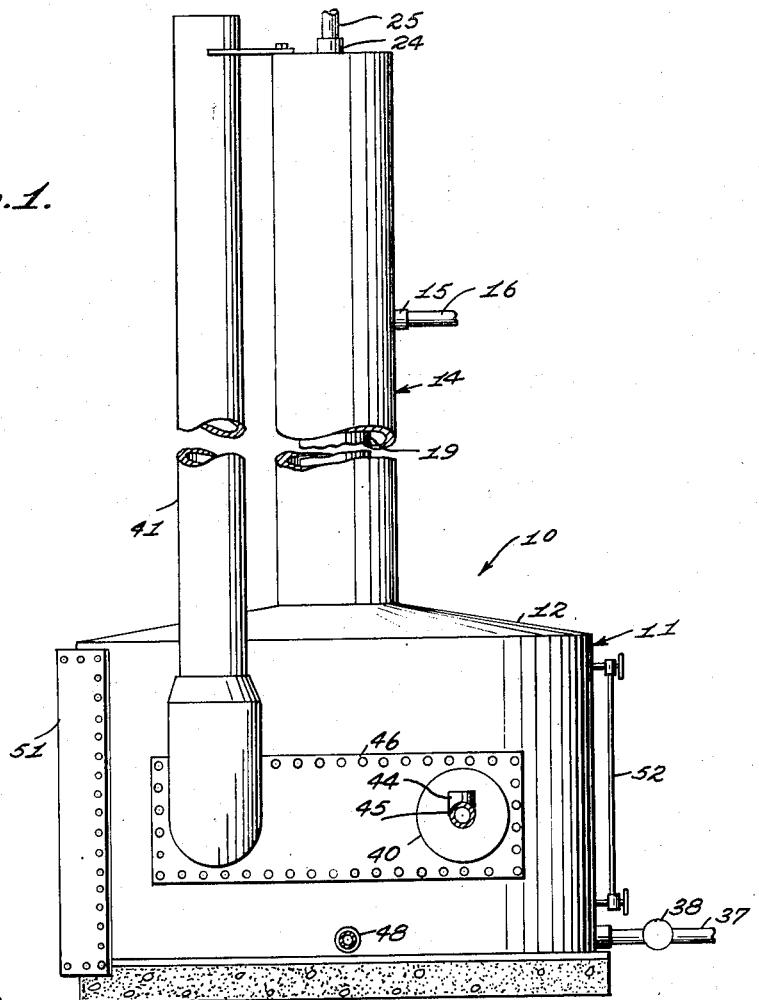
Figure 1 is an elevational view, with parts broken away and shown in section, of the atmosphere-type emulsion treater of the present invention.
Figure 2:
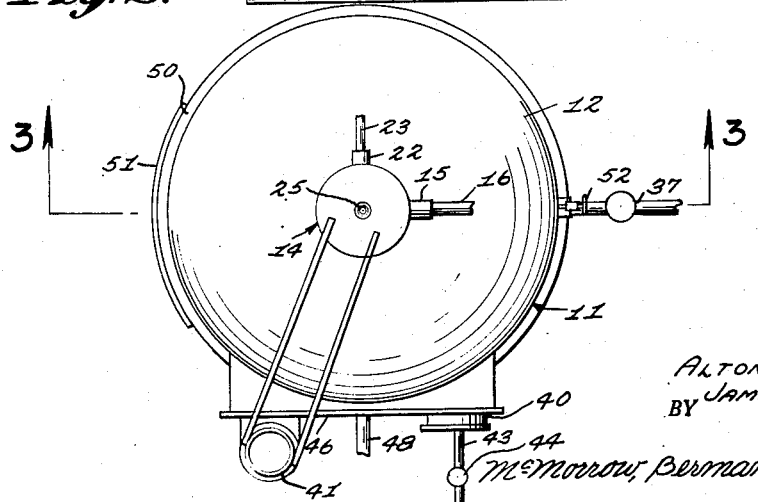
Figure 2 is a top plan view of the atmosphere-type emulsion treater shown in Figure 1.

Referring now more particularly to the drawings, wherein like reference numerals have been used throughout the several views to designate like parts, there is shown the emulsion treater of the present invention, generally designated by the reference numeral 10, which includes a settling tank 11 having a dome top 12 and including an emulsion-treating chamber 13.

Rising from the settling tank 11 is an oil discharge tube 14 which has the lower end thereof secured to the dome top 12 in communication with the treating chamber 13. Projecting outwardly of the discharge tube 14 is an outlet neck 15 to which is secured a discharge pipe 16.

Bridging the oil discharge tube 14 contiguous to and spaced from the upper end thereof is a plate 17 which is secured to the discharge tube 14 and cooperates therewith to define an oil and gas-separating chamber 18 separated from the interior of the oil discharge tube 14.

Disposed interiorly of and concentrically of the oil discharge tube 14 is an oil delivery tube 19 which has one end extending into the tank 11 and supported on the bottom thereof and has the other end terminating in communication with the oil and gas-separating chamber 18. As clearly shown in Figure 3, the oil delivery tube includes a pair of sections 20 and 21 disposed in end-to-end, aligned relation with respect to each other, the section 20 being removable from the position illustrated in Figure 3, for a purpose to be subsequently described.

Projecting outwardly of the oil and gas-separating chamber 18 is an emulsion inlet sleeve 22 which is connected to an inlet pipe 23 for introducing the emulsion to be cleaned into the oil and gas-separating chamber for gravitation downwardly through the oil delivery tube 19. Projecting upwardly from the upper end of the oil and gas-separating chamber 18 is a gas outlet sleeve 24 which is connected to an outlet pipe 25 for withdrawing the gas from the separating chamber 18. Disposed within the oil and gas-separating chamber 18 intermediate the inlet sleeve 22 and the gas outlet sleeve 24 are horizontally disposed baffle plates 26 and 27, the baffle plate 26 projecting inwardly from one side of the chamber and terminating at a point spaced from the other side thereof, and the baffle plate 27 projecting inwardly from the other side of the chamber and terminating contiguous to and spaced from the first-named side thereof.

Disposed longitudinally of the oil and gas-separating chamber 18 is a pressure equalizing conduit 29 which has one end extending through the baffle plate 27 and supported in communication with the upper end of the oil and gas-separating chamber, and has the other end extending through the plate 17 and supported in communication with the interior of the oil discharge tube 14.

Bridging the upper portion of the treating chamber 13 is a filtering body 30 which includes a pair of spaced foraminous plates 31 and 32 disposed transversely of and secured within the settling tank 11, and a mass of filtering material 33 loosely supported between the plates for breaking down the emulsion and returning the water to the treating chamber 13.

Arranged contiguous to and spaced from the bottom of the settling tank 11 is an atomizing structure, generally designated by the reference numeral 34, which is connected in communication with the oil delivery tube 19 for breaking up the emulsion into small globules and discharging the globules into the treating chamber 13 for upward discharge through the filtering body 30 into the oil discharge tube 14. The atomizing structure 34 includes a plurality of radially extending, horizontally disposed, perforated tubes 35, each of which has one end supported in communication with the oil delivery tube. As clearly shown in Figure 4, six tubes are employed, each of which is provided with suitable longitudinally spaced apertures 36.

Projecting outwardly of the oil delivery tube 19 below the atomizing structure 34 is a horizontally disposed drain pipe 37 which projects exteriorly of the tank 11 and is provided with a suitable control valve 38 for selectively withdrawing accumulations within the oil delivery tube 19.

Disposed transversely of the treating chamber 13 and circumposed about the oil delivery tube 19 is a horizontally disposed, U-shaped flue 40 which has its ends projecting exteriorly of the tank 11. Projecting upwardly from one end of the heating flue 40 is a stack 41 which is supported exteriorly of the emulsion treater in spaced, parallel relation with respect to the oil discharge tube. The other end of the flue 40 is provided with a suitable burner 42 which is connected by means of a conduit 43 through an automatic thermostat control valve 44 to a fuel supply line 45. As clearly shown in Figure 1, the entire heating structure is supported on a mounting plate 46 which is bolted to a suitable opening provided in the adjacent wall of the settling tank 11. As previously pointed out, the oil delivery tube 19 includes a lower section 20 which may be moved from the position illustrated in Figure 3 to a position flat on the bottom of the tank 11, thereby permitting the heating structure to be moved as a unit from the tank when the mounting plate 46 is unbolted from the adjacent tank wall.

Connected in communication with the treating chamber 13 is a water outlet 48 for withdrawing the contents of the chamber. Operatively connected to the outlet pipe 48 is an adjustable siphon structure 49 for maintaining the oil and water interface in the treating chamber 13 at a predetermined level. Under actual operating conditions, the oil and water interface is contiguous to the lower foraminous plate 31 of the filtering body 30.

The settling tank 11 is provided with a manhole opening 50 permitting the operator to enter the interior of the settling tank 11 to inspect and service the various components contained therein. Bridging the manhole opening 50 is a suitable closure 51 which is detachably secured to the adjacent bounding walls of the settling tank 11. In actual use, the emulsion enters the treater through the inner pipe 23. Upon entering the oil and gas-separating chamber 18, the gas will flow upwardly and outwardly through the gas outlet pipe 25, while the oil and water emulsion will gravitate downwardly through the oil inlet tube 19 and into the various perforated tubes 35 of the atomizing structure 34. As the emulsion travels downwardly through the oil delivery tube 19, the emulsion will be preheated by contact with the heat exchange face of the concentric oil delivery and discharge tubes. As the emulsion leaves the tubes 35 of the atomizing structure 34, it is broken up into a number of small beads or globules which will travel upwardly through the heated contents of the treating chamber 13. As the beads or globules pass upwardly through the filter body 30, the emulsion is broken down and the water which is filtered out is permitted to settle back into the oil and water interface. After leaving the filter body 30, the cleaned oil travels upwardly into and through the oil discharge tube, where it loses some of its heat to the atmosphere through the other concentric tube 14 of the heat exchanger and some of its heat to the cold incoming emulsion through the inner concentric tube 19 of the heat exchanger. The cleaned oil is finally discharged from the discharge pipe 16 at approximately atmospheric temperature and pressure. The oil and water interface level is maintained by use of the adjustable siphon 49 which is connected to the water outlet pipe 48. Furthermore, the tank 11 can be provided with a level-indicating tube 52 for indicating the level of the contents of the interior of the tank.

Although only one embodiment of the atmosphere-type emulsion treater of the present invention has been described, it is readily apparent that numerous modifications can be made without departing from the spirit of the invention as set forth in the appended claims.

What we claim is:

1. An emulsion treater comprising a settling tank defining an emulsion-treating chamber, an oil discharge tube mounted vertically on the tank and having its lower end secured in communication with the tank, an oil delivery tube disposed interiorly of and concentrically of the oil discharge tube and having one end mounted on the base of the tank and having its opposing end spaced from the upper end of the oil discharge tube, said delivery tube being radially spaced from the discharge tube, a plate bridging the space between the upper end of the delivery tube and the discharge tube, and defining with the upper end of the discharge tube and the delivery tube an oil and gas separating chamber, emulsion inlet means connected to the upper end of the discharge tube for introducing emulsion to be cleaned into the oil and gas separating chamber for gravitation downwardly through the oil delivery tube, gas outlet means connected in communication with the upper end of the discharge tube for withdrawing gas from the oil and gas separating chamber, a filter body mounted in the upper portion of the treating chamber and circumposed on the oil delivery tube, atomizing tubes radially extending from the oil delivery tube below the filter body and communicating with the delivery tube, for breaking up the emulsion into small globules and discharging the globules into the treating chamber for passage through the filter body and into the oil discharge tube, heating means arranged within the treating chamber for heating the contents thereof, and outlet means extending from the oil discharge tube.

2. The combination of claim 1, wherein said oil delivery tube is provided with a drain tube that extends radially from the lower end thereof and exteriorly of the settling tank.

3. The combination of claim 1, wherein a water outlet is connected in communication with the treating chamber and adjustable siphon means is connected to said water outlet for maintaining the oil and water interface in said treating chamber at a predetermined level.

4. The combination of claim 1, wherein a pressure equalizer conduit is connected in communication with the interior of the oil discharge tube and with the upper end of said oil and gas separating chamber.

ALTON P. MUSSLEWHITE.
JAMES W. MUSSLEWHITE.

REFERENCES CITED

The following references are of record in the file of this patent:

UNITED STATES PATENTS

| Number | Name | Date |
| --- | --- | --- |
| 2,211,171 | Self | Aug. 13, 1940 |
| 2,420,115 | Walker et al. | May 6, 1947 |